United States Patent
Zaiss

(10) Patent No.: US 6,521,315 B1
(45) Date of Patent: Feb. 18, 2003

(54) METHOD FOR MAKING A STAMPER FOR USE IN MAKING A SUBSTRATE FOR A DIGITAL VERSATILE DISC

(75) Inventor: Roland P. Zaiss, Ludwigsburg (DE)

(73) Assignee: Fairchild Holding Corp., Dulles, VA (US)

( * ) Notice: Subject to any disclaimer, the term of this patent is extended or adjusted under 35 U.S.C. 154(b) by 0 days.

(21) Appl. No.: 09/538,041

(22) Filed: Mar. 29, 2000

Related U.S. Application Data

(60) Provisional application No. 60/126,994, filed on Mar. 30, 1999.

(51) Int. Cl.$^7$ ............................. B32B 3/02; B26F 1/24
(52) U.S. Cl. ......................................... 428/64.1; 83/30
(58) Field of Search ............................. 428/64.1, 64.2, 428/64.4, 457, 913; 430/270.12, 495.1, 945; 369/275.1, 283, 288; 83/30, 55

(56) References Cited

U.S. PATENT DOCUMENTS

| | | | |
|---|---|---|---|
| 5,681,634 A | | 10/1997 | Miyamoto et al. |
| 6,263,939 B1 | * | 7/2001 | Miyamoto .................. 156/539 |
| 6,267,578 B1 | * | 7/2001 | Kakinuma .................. 425/175 |

FOREIGN PATENT DOCUMENTS

| EP | 0 756 274 A | 1/1997 |
|---|---|---|

OTHER PUBLICATIONS

Abstract of Japanese Patent Publication 09–091770 A, Patent Abstracts of Japan, vol. 1997, No. 8, Aug. 29, 1997.
Abstract of Japanese Patent Publication 09–219040 A, Patent Abstracts of Japan, vol. 1997, No. 12, Dec. 25, 1997.
Abstract of Japanese Patent Publication 09–293279 A, Patent Abstracts of Japan, vol. 1998, No. 3, Feb. 27, 1998.
Abstract of Japanese Patent Publication 10–199042 A, Patent Abstracts of Japan, vol. 1998, No. 12, Oct. 31, 1998.

\* cited by examiner

Primary Examiner—Elizabeth Mulvaney
(74) Attorney, Agent, or Firm—Martine & Penilla, LLP

(57) ABSTRACT

In a method for making a substrate for a digital versatile disc, a stamper having a front side with a pitted surface, a back side, and a central opening is first provided. The central opening is defined by a surface having an edge on the front side and an edge on the back side. A burr is formed on the edge of the surface on the front side of the stamper, e.g., by punching the central hole from the back side of the stamper. The stamper is then disposed within a mold such that the front side faces the mold cavity. Thereafter, the substrate is molded in the mold. In the molding process, the burr on the front side of the stamper forms a rounded edge in one of the walls defining an annular groove in the substrate. This rounded edge enables substrates to be bonded together with an extremely thin layer of adhesive material without the centering and alignment problems caused by burrs. A digital versatile disc including a substrate formed by this method and a method for forming a stamper for use in the manufacture of a substrate for a digital versatile disc also are described.

3 Claims, 5 Drawing Sheets

US 6,521,315 B1

METHOD FOR MAKING A STAMPER FOR USE IN MAKING A SUBSTRATE FOR A DIGITAL VERSATILE DISC

CROSS REFERENCE TO RELATED APPLICATIONS

This application claims priority from U.S. Provisional Patent Application No. 60/126,994, filed Mar. 30, 1999, and entitled "Method for Making A Substrate for a Digital Versatile Disc." The disclosure of this provisional application is incorporated herein by reference.

BACKGROUND OF THE INVENTION

The present invention relates generally to digital versatile discs and, more particularly, to a method for making a substrate for a digital versatile disc, a digital versatile disc including the substrate, and a method for making a stamper for use in the manufacture of a substrate for a digital versatile disc.

The latest generation of optical disc technology is the digital versatile disc (DVD), which is sometimes referred to as a digital video disc. A DVD has significantly more data capacity than a compact disc (CD). For example, the data capacity of DVD 5 is about 4.7 GB, which corresponds to the data capacity of about seven CDs. The data capacity of DVD 9 is about 8.5 GB, which corresponds to the data capacity of about thirteen CDs.

In the manufacturing of current DVDs, two 0.6 mm polycarbonate substrates are bonded together with an adhesive material. These substrates are typically formed by an injection molding process in which a stamper is disposed within a mold cavity. The stamper, which is typically comprised of nickel, has a pitted surface on the side facing the mold cavity. This pitted surface forms a pitted surface corresponding to recorded data in the side of the substrate facing the stamper. The stamper is typically held in the mold cavity using a vacuum technique or a mechanical technique, e.g., a bushing. A central hole is provided in the stamper to facilitate alignment of the stamper within the mold cavity.

The central hole in stampers used in conventional CD and DVD manufacturing processes has been heretofore punched from the pitted side of the stamper. The central hole is defined by a surface of the stamper having two edges: one edge on the pitted side and the other edge on the back side. When the central hole is punched from the pitted side, the edge on the pitted side has a small radius, i.e., a chamfer or bevel, and the edge on the back side has a small burr. FIG. 1 shows stamper 10 having a central hole punched from the pitted side disposed within a mold cavity using a vacuum hold technique. As shown therein, burr 12 on the back side edge prevents stamper 10 from resting squarely against mold 14. Consequently, small gap 16 may be formed between the back side of stamper 10 and mold 14. A small gap 18 also may be formed between the surface of stamper 10 that defines the central hole and mold protrusion 20 that defines a groove in the substrate.

Punching the central hole in the stamper from the pitted side is undesirable for at least two reasons. First, the gaps between the stamper and the mold cause the stamper to move or bend when polycarbonate is injected into the mold cavity. This results in increased wear and poor mold quality. Second, the molded substrate has a burr that sticks out from the pitted side thereof. This burr causes centering and alignment problems when two substrates are bonded together with a thin layer of adhesive material to form a DVD.

FIG. 2 illustrates how a burr on the pitted side of the substrate interferes with the bonding of two substrates to form a DVD. As shown therein, opposing burrs 24a and 24b prevent substrates 22a and 22b from resting squarely against one another. Consequently, centering and alignment of the substrates is problematic. The distance, x, by which substrates 22a and 22b are out of alignment depends on the sizes of burrs 24a and 24b. Moreover, even if the substrates are centered properly, once released they may spring out of alignment.

In view of the foregoing, there is a need for a DVD substrate that does not have a burr that sticks out from the pitted side thereof.

SUMMARY OF THE INVENTION

Broadly speaking, the present invention fills this need by providing a stamper having a central hole that is punched from the back side thereof. When such a stamper is used to form a substrate for a DVD, the substrate does not have a burr that sticks out from the pitted side thereof.

In one aspect of the present invention, a method for making a substrate for a DVD is provided. In this method a stamper is first provided. The stamper has a front side with a pitted surface, a back side, and a central opening. The central opening is defined by a surface having an edge on the front side and an edge on the back side. A burr is formed on the edge of the surface on the front side of the stamper. The stamper is disposed within a mold such that the front side faces the mold cavity. Thereafter, the substrate is molded in the mold. In the molding process, the burr on the front side of the stamper forms a rounded edge in one of the walls defining an annular groove in the substrate.

In another aspect of the invention, a method for making a stamper for use in the manufacture of a substrate for a DVD is provided. In this method a stamper without a central hole is first provided. The stamper has a front side with a pitted surface and a back side. A central hole is then formed in the stamper from the back side thereof, preferably by punching. In one embodiment, the punch is aligned with an optical centering device arranged on a die side of the punch. In another embodiment, a pilot hole having a first diameter is first formed in the stamper. The central hole having a second diameter, which is greater than the first diameter, is then punched in the stamper from the back side thereof using the pilot hole to align the punch. In one embodiment, the punch is aligned with a guiding pin attached to the punch.

In yet another aspect of the invention, a DVD is provided. The DVD includes first and second substrates each having a central opening therein. The first substrate is disc-shaped and has a pitted surface with an annular groove formed therein. The second substrate is disc-shaped and has a surface with an annular groove formed therein. The grooves in the first and second substrates are defined by an inner wall and an outer wall having a rounded upper edge. The first and second substrates are bonded together such that the grooves in the pitted surface of the first substrate and the surface of the second substrate face one another and define an adhesive restraining cavity. In the case of a DVD 9, the surface of the second substrate also is pitted.

The present invention provides, among other things, a stamper having a central hole punched or otherwise formed from the back side thereof. Using this stamper, a substrate for making a DVD can be molded without having a burr form on the pitted side of the substrate. Thus, the present invention advantageously enables substrates to be bonded together to form a DVD using an extremely thin layer of adhesive material without the centering and alignment problems caused by burrs.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE INVENTION

Figure 1:
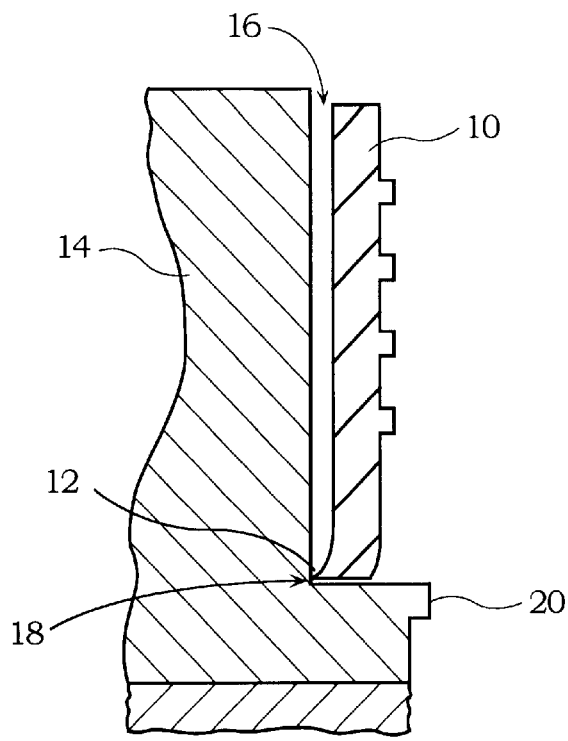
FIG. 1 shows a conventional stamper having a central hole punched from the pitted side disposed within a mold cavity using a vacuum hold technique.
Figure 2:
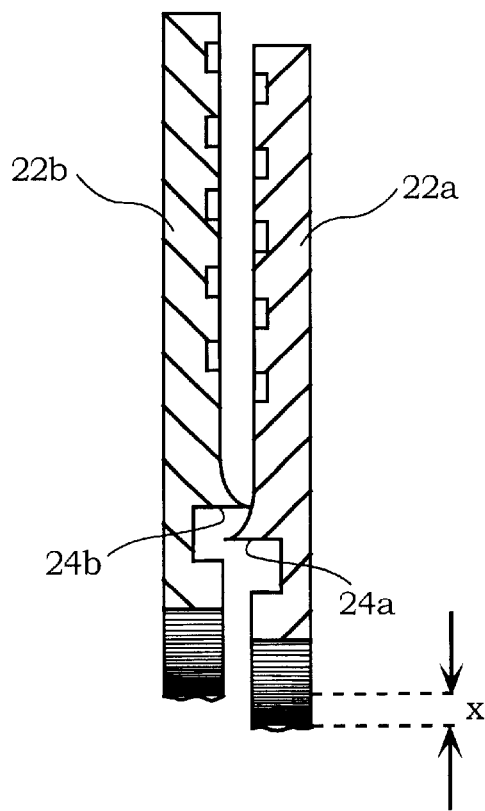
FIG. 2 illustrates how a burr on the pitted side of a substrate interferes with the bonding of two substrates to form a conventional DVD.

Several exemplary embodiments of the invention will now be described in detail with reference to the accompanying drawings. FIGS. 1 and 2 are discussed above in the "Background of the Invention" section.

Figure 3:
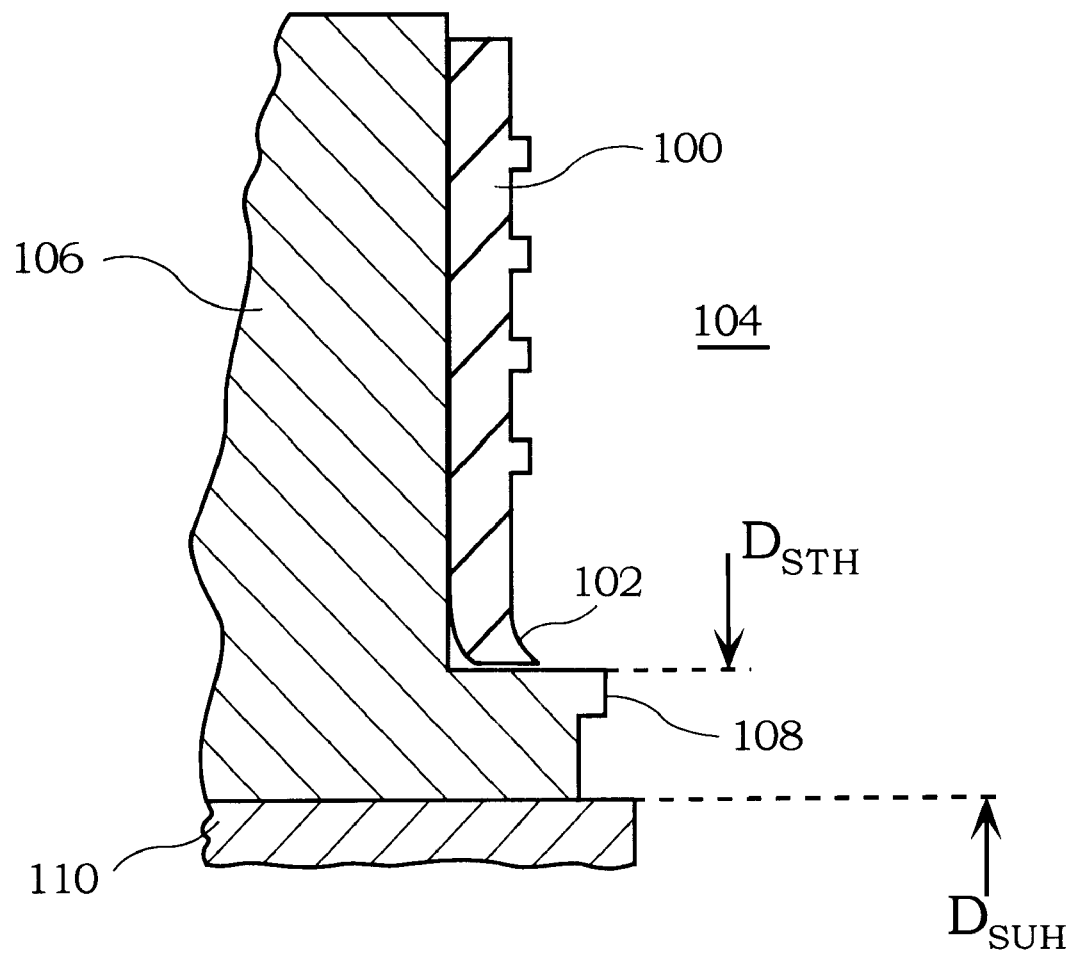
FIG. 3 is a partial cross-sectional view of a stamper formed in accordance with one embodiment of the invention disposed in a mold using a vacuum hold technique.

FIG. 3 is a partial cross-sectional view of a stamper formed in accordance with one embodiment of the invention disposed in a mold using a well-known vacuum hold technique. Those skilled in the art will appreciate that only a portion of the upper half of the stamper and the mold is shown in FIG. 3. As shown therein, the central hole of stamper 100 is formed, e.g., punched, from the back side thereof such that burr 102 is formed on the front edge of the surface defining the central opening in the stamper. Burr 102 is on the pitted side of stamper 100 that faces mold cavity 104 and extends slightly into the mold cavity. Otherwise, the back side of stamper 100 rests squarely against mold 106. Those skilled in the art are familiar with suitable techniques for forming the pits in the pitted side of stamper 100.

As shown in FIG. 3, mold 106 includes projection 108 and built-in molding tool 110, which are configured to define an annular groove in a substrate formed in the mold that will define part of an adhesive restraining cavity, as will be explained in more detail below. Built-in molding tool 110 also is used to punch out a central hole in a substrate formed in mold 106 as is known to those skilled in the art. The diameter of the central hole in stamper 100, $D_{STH}$, is selected so that the inner surface of the stamper, i.e., the surface defining the central hole in the stamper, firmly abuts against projection 108. Depending on the size of the mold, $D_{STH}$, may be varied in a range from about 20 mm to about 25 mm; however, other diameters also may be used. In one embodiment, $D_{STH}$ is about 21.5 mm. The outer diameter of built-in molding tool 110 is selected to obtain the desired diameter of a central hole of a substrate formed in the mold. In one embodiment, the diameter of the central hole of a substrate formed in the mold, $D_{SUH}$, is about 15 mm.

Figure 4:
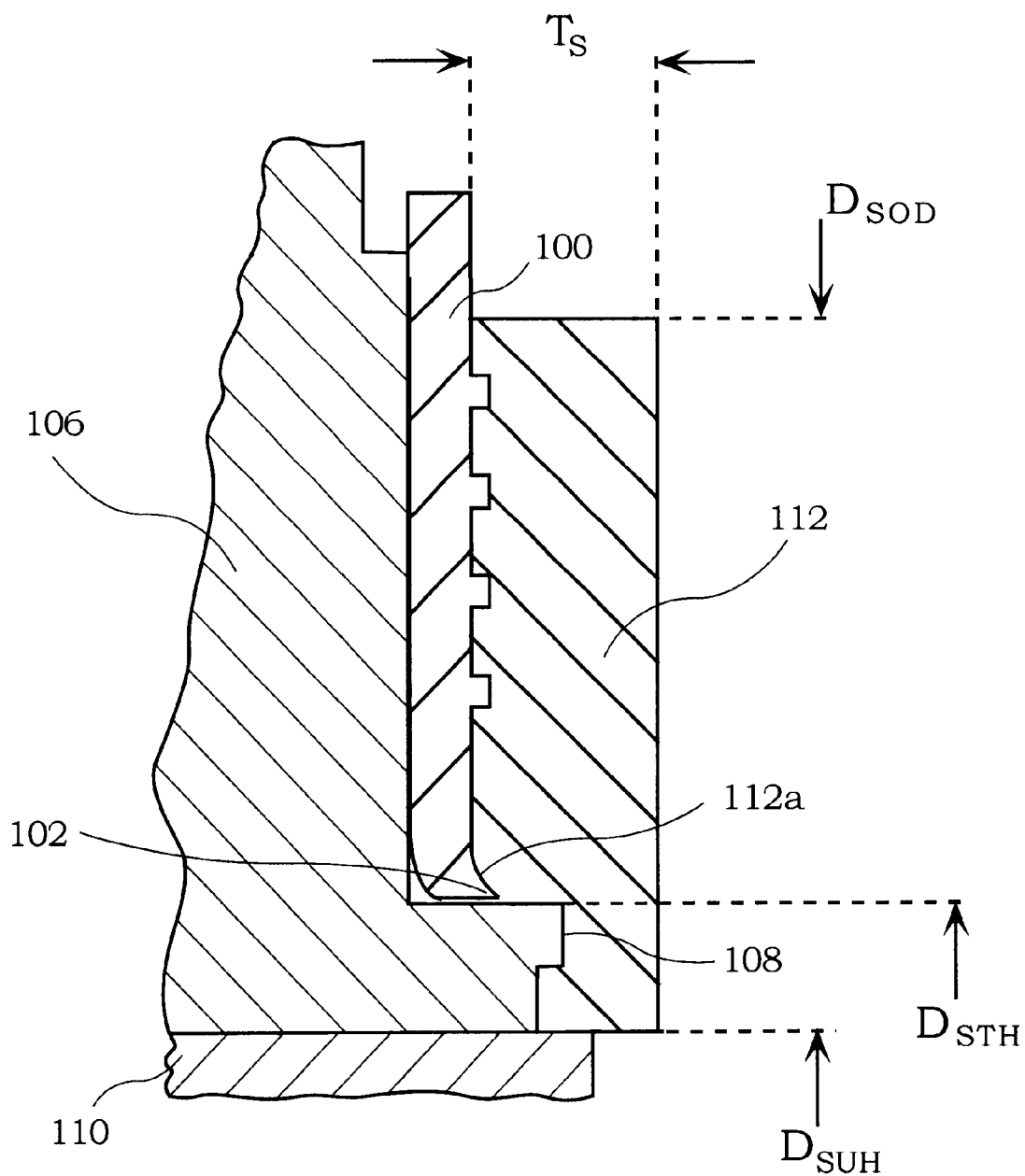
FIG. 4 is a partial cross-sectional view of a molded substrate formed in the mold shown in FIG. 3.

FIG. 4 is a partial cross-sectional view of a molded substrate formed in the mold shown in FIG. 3. As shown therein, burr 102 on the pitted side of stamper 100 forms rounded edge 112a in the portion of the molded substrate 112 near mold protrusion 108, which defines an edge of an annular groove in the substrate. Thus, stamper 100, which has a central hole punched from the back side, avoids the formation of a burr on molded substrate 112. As is well known to those skilled in the art, the thickness, T, of molded substrate 112 may be varied. In one embodiment, the thickness, T, of molded substrate 112 is about 0.6 mm.

Figure 5:
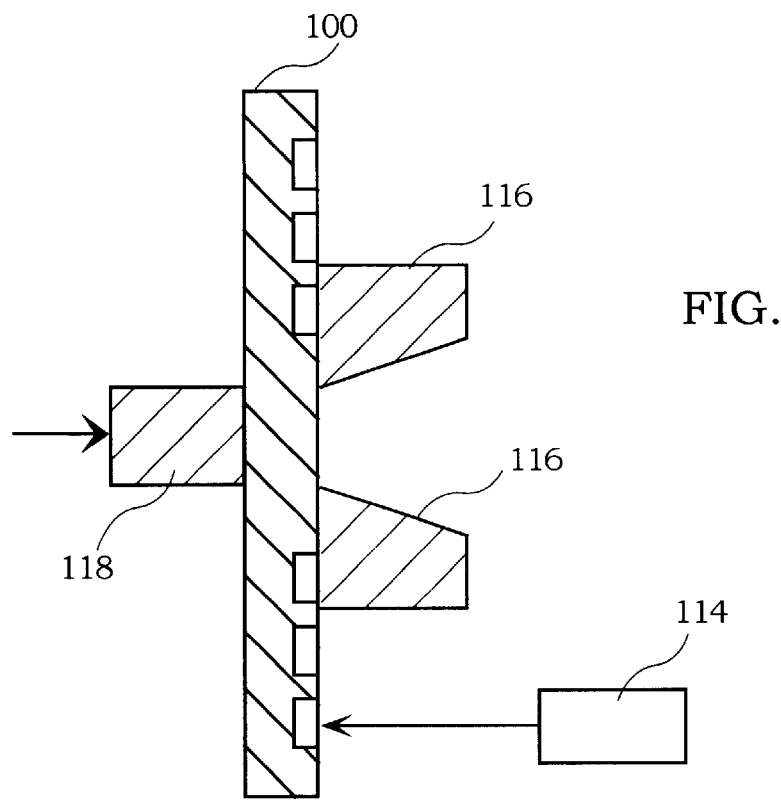
FIG. 5 is a simplified cross-sectional view of an exemplary method by which the central hole may be punched in the stamper from the back side thereof in accordance with one embodiment of the invention.

FIG. 5 is a simplified cross-sectional view of an exemplary method by which the central hole may be punched in the stamper from the back side thereof in accordance with one embodiment of the invention. As shown therein, optical centering device 114 and die 116 are disposed on the pitted side of the stamper. As is well known to those skilled in the art, optical centering device 114 centers the stamper by reading the pits in the pitted surface thereof. Punch 118 is disposed on the back side of the stamper. When the stamper is centered, the central hole is punched from the back side of stamper 110 by pushing punch 118 through the stamper and into die 116.

Figure 6:
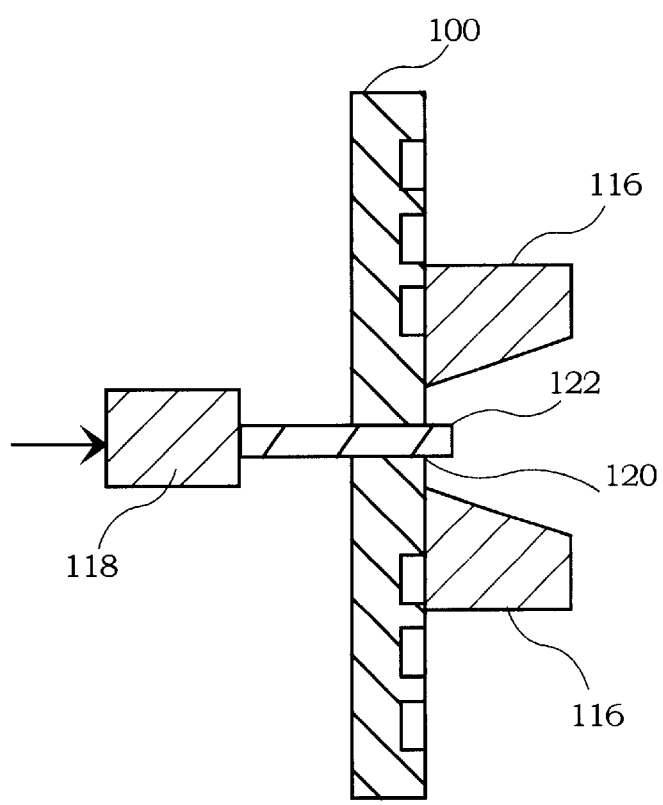
FIG. 6 is a simplified cross-sectional view of another exemplary method by which the central hole may be punched in the stamper from the back side thereof in accordance with another embodiment of the invention.

FIG. 6 is a simplified cross-sectional view of another exemplary method by which the central hole may be punched in the stamper from the back side thereof in accordance with another embodiment of the invention. In this method, pilot hole 120 having a first diameter is first formed in stamper 100 by punching the stamper from the pitted side thereof. Pilot hole 120 may be centered using an optical centering device arranged as shown in FIG. 5. Pilot hole 120 may then be expanded to form the central hole by pushing punch 118 with guide pin 122 attached thereto through stamper 100 and into die 116 from the back side of the stamper. In combination with guide pin 122, pilot hole 120 serves to align punch 118 to ensure that the central hole formed in stamper 100 is properly aligned. The central hole has a second diameter, which is larger than the first diameter.

Figure 7:
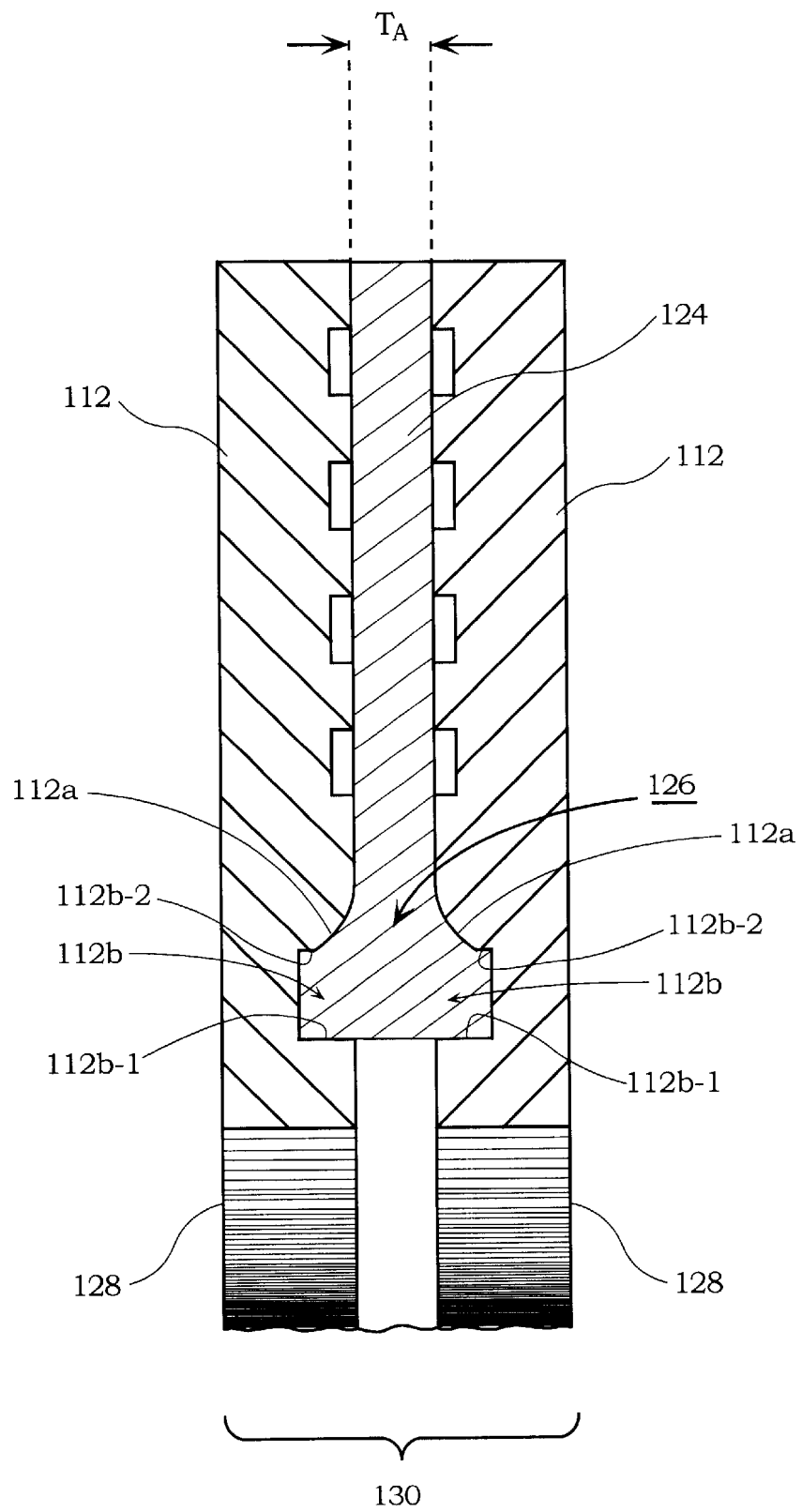
FIG. 7 is a partial cross-sectional view of a simplified DVD formed by bonding two substrates made in accordance with one embodiment of the invention.

FIG. 7 is a partial cross-sectional view of a simplified DVD formed by bonding two substrates made in accordance with one embodiment of the invention. For ease of illustration, the films coated on the substrates to reflect light, i.e., the film of reflective material coated on one of the substrates and the film of semireflective material coated on the other substrate, have been omitted. As shown in FIG. 7, each of substrates 112 has annular groove 112b formed in one surface that is defined by inner wall 112b-1 and outer wall 112b-2 having rounded, i.e., chamfered or beveled, upper edge 112a. When substrates 112 are bonded together such that the surfaces having annular grooves 112b formed therein face one another, opposing grooves 112b define adhesive restraining cavity 126, which prevents any excessive adhesive material from adhesive layer 124 from reaching the center portion of DVD 130 where a label or other printed matter may be affixed. The center portion of DVD 130 includes those portions of substrates 112 that surround central holes 128 formed in each of the substrates.

Outer walls 112-b2 of annular grooves 112b that define adhesive restraining cavity 126 have rounded upper edges 112a, as opposed to burrs, by virtue of being formed with a stamper having a central hole punched from the back side thereof. Rounded upper edges 112a enable substrates 112 to be bonded together with an extremely thin layer of adhesive material without the centering and alignment problems caused by burrs. In the case of a DVD 9, the thickness, $T_A$, of adhesive layer 124 may be in a range from about 40 $\mu$m to about 70 $\mu$m.

The DVD shown in FIG. 7 is a simplified DVD 9 in which each of the substrates has a pitted surface. It will be apparent to those skilled in the art that the burr-free substrates of the invention may be bonded together to form any type of DVD, including those in which only one of the substrates has a pitted surface, e.g., DVD 5.

As is well known to those skilled in the art, the substrates may be formed of any suitable plastic material, e.g., polycarbonate. In the case of a DVD 9, one of the substrates is coated with a reflective material, e.g., aluminum, and the other substrate is coated with a semireflective material, e.g., gold, silicon, or a silicon derivative. The processes used to coat a substrate with a reflective or semireflective material are well known to those skilled in the art. The substrates may be bonded together with any adhesive material suitable for DVD bonding. In the fabrication of a DVD 9 or a DVD 18, a free radical ultraviolet-curing adhesive such as, for example, Desolite 650-002. which is commercially available from DSM Desotech Inc. of Elgin, Ill., may be used. Those skilled in the art will appreciate that in the fabrication of other types of DVDs, e.g., DVD 5 and DVD 10, different types of adhesives, e.g., hot-melt adhesives and cationic ultraviolet-curing adhesives, may be used. Additional details regarding the manufacturing of DVDs are set forth in U.S. application Ser. No. 09/281,641, which was filed on Mar. 30, 1999, and is entitled "Method for Making Digital Versatile Discs." The disclosure of this application is incorporated herein by reference.

The present invention provides, among other things, a stamper having a central hole punched or otherwise formed from the back side thereof. Using this stamper, a substrate for making a DVD can be molded without having a burr form on the pitted side of the substrate. Thus, the present invention advantageously enables substrates to be bonded together to form a DVD using an extremely thin layer of adhesive material without the centering and alignment problems caused by burrs.

In summary, the present invention provides a method for making a substrate for a digital versatile disc, a digital versatile disc including the substrate, and a method for making a stamper for use in the manufacture of a substrate for a digital versatile disc. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. A method for making a stamper for use in the manufacture of a substrate for a digital versatile disc, comprising:

providing a stamper having a front side and a back side, the front side having a pitted surface; and punching a central hole in the stamper from the back side thereof with a punch that is aligned with an optical centering device, the optical centering device being arranged on a die side of the punch.

2. The method of claim 1, wherein the punch is aligned with a guiding pin attached to the punch.

3. A method for making a stamper for use in the manufacture of a substrate for a digital versatile disc, comprising:

providing a stamper having a front side and a back side, the front side having a pitted surface;

forming a pilot hole having a first diameter in the stamper; and punching a central hole having a second diameter in the stamper from the back side thereof using the pilot hole to align a punch, the second diameter being larger than the first diameter.

* * * * *